(12) United States Patent
Oomori et al.

(10) Patent No.: US 9,029,744 B2
(45) Date of Patent: May 12, 2015

(54) MICROWAVE HEATING APPARATUS

(75) Inventors: Yoshiharu Oomori, Shiga (JP);
Tomotaka Nobue, Kyoto (JP); Kenji Yasui, Shiga (JP); Makoto Mihara, Nara (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 380 days.

(21) Appl. No.: 13/635,864

(22) PCT Filed: Mar. 15, 2011

(86) PCT No.: PCT/JP2011/001505
§ 371 (c)(1),
(2), (4) Date: Sep. 18, 2012

(87) PCT Pub. No.: WO2011/114711
PCT Pub. Date: Sep. 22, 2011

(65) Prior Publication Data
US 2013/0008896 A1    Jan. 10, 2013

(30) Foreign Application Priority Data
Mar. 19, 2010 (JP) ................ 2010-063818

(51) Int. Cl.
*H05B 6/64* (2006.01)
*H05B 6/70* (2006.01)
(Continued)

(52) U.S. Cl.
CPC ............... *H05B 6/705* (2013.01); *H05B 6/70* (2013.01); *H05B 6/686* (2013.01); *H05B 6/72* (2013.01); *Y02B 40/143* (2013.01); *Y02B 40/146* (2013.01)

(58) Field of Classification Search
CPC .......... H05B 6/686; H05B 6/705; H05B 6/72; Y02B 40/143; Y02B 40/146
USPC .................................... 219/756–763
See application file for complete search history.

(56) References Cited

U.S. PATENT DOCUMENTS 7,223,951 B2 * 5/2007 Jung ........................ 219/708

FOREIGN PATENT DOCUMENTS

| JP | 56-132793 A | 10/1981 |
|----|-------------|---------|
| JP | 59-134593 A | 8/1984  |

(Continued)

OTHER PUBLICATIONS

International Preliminary Report on Patentability for International Application No. PCT/JP2011/001505, dated Oct. 23, 2012, 6 pages.

(Continued)

*Primary Examiner* — Sang Y Paik
(74) *Attorney, Agent, or Firm* — Brinks Gilson & Lione

(57) ABSTRACT

A microwave heating apparatus includes, within a heating room, a placement table having a horizontal placement surface for placing an object to be heated, and a plurality of feeding portions which are placed on a wall surface of the heating room for supplying microwave electric power to the heating room. The microwave heating apparatus is adapted to relatively move the position of the straight line connecting two feeding portions to each other, with respect to the object to be heated, through a movement mechanism portion, and to detect a phase difference between the microwave electric powers which minimizes reflected electric power returning from the heating room to the two feeding portions, for detecting the state of placement of the object to be heated on the placement table.

12 Claims, 7 Drawing Sheets

(51) Int. Cl.
*H05B 6/68* (2006.01)
*H05B 6/72* (2006.01)

(56) References Cited

FOREIGN PATENT DOCUMENTS

| JP | 59-165399 | A | 9/1984 |
| JP | 62-048354 | B2 | 10/1987 |
| JP | 2008-310969 | A | 12/2008 |
| JP | 2009-181728 | A | 8/2009 |
| JP | 2009-238402 | A | 10/2009 |

OTHER PUBLICATIONS

International Search Report for International Application No. PCT/JP2011/001505, dated Jun. 14, 2011, 2 pages.

* cited by examiner

MICROWAVE HEATING APPARATUS

This application is a 371 application of PCT/JP2011/001505 having an international filing date of Mar. 15, 2011, which claims priority to JP2010-063818 filed Mar. 19, 2010, the entire contents of which are incorporated herein by reference.

TECHNICAL FIELD

The present invention relates to microwave heating apparatuses including microwave generating portions formed from semiconductor devices.

BACKGROUND ART

Some conventional microwave heating apparatuses of this type have been adapted to include an oscillation portion constituted by semiconductor devices, a plurality of amplification portions for amplifying the output of the oscillation portion, a heating room which is supplied with microwave electric powers outputted from the amplification portions through feeding portions, and an impedance detection portion for detecting the impedances of the feeding portions for supplying microwave electric powers to the heating room (refer to Patent Literature 1, for example). Such conventional microwave heating apparatuses have been adapted to control the oscillating frequency based on the result of detection by the impedance detection portion, to thereby perform stable cooking on objects to be heated within the heating room without inducing heating unevenness.

Also, there have been some conventional microwave heating apparatuses adapted to include a microwave heating power source which is variable in oscillating frequency, an antenna serving as a feeding portion for supplying microwave electric power to a heating room, and a detector for detecting reflected electric power from the antenna (refer to Patent Literature 2, for example). The conventional microwave heating apparatuses have been adapted to track an oscillating frequency of the microwave heating power source which minimizes the reflected electric power and to drive the microwave heating power source around this oscillating frequency, to thereby continuously drive the microwave heating power source with higher electric power efficiency.

Further, there have been also some conventional microwave heating apparatuses adapted to include an oscillation portion constituted by semiconductor devices, a dividing portion for dividing the output of the oscillation portion into a plurality of parts, a plurality of amplification portions for amplifying the respective outputs resulted from the division, and a synthesizing portion for synthesizing the outputs of the amplification portions (refer to Patent Literature 3, for example). Such conventional microwave heating apparatuses have been provided with a phase shifter between the dividing portion and the amplification portions. These conventional microwave heating apparatuses have been adapted to control the phase shifter for arbitrarily and immediately changing the phase difference and the ratio between electric powers radiated from the plurality of antennas, in order to perform uniform heating on objects to be heated within the heating room.

PLT 1: Unexamined Japanese Patent Publication No. S59-165399

PLT 2: Examined Japanese Patent Publication No. S62-048354

PLT 3: Unexamined Japanese Patent Publication No. S56-132793

SUMMARY OF THE INVENTION

Technical Problem

In conventional microwave heating apparatuses, there have been suggested multi-feeding systems for supplying electricity to heating rooms through a plurality of antennas. However, microwave heating apparatus employing such multi-feeding systems have had the problem of difficulty of heating, in desired states, various amounts of various objects to be heated having different shapes and being of different types which are housed in the heating room.

With a microwave heating apparatus employing a single-feeding system for supplying microwave electric power to a heating room through a single antenna, it is possible to optimize the oscillating frequency based on results of detections of reflected electric power and impedances in the heating room, thereby adjusting heating unevenness for performing operations with higher electric power efficiency. However, supply of microwave electric power to a heating room at a single position has been insufficient to properly heat various amounts of various objects to be heated having different shapes and being of different types. In cases of applying the structures of conventional microwave heating apparatuses to multi-feeding systems having antennas as feeding portions at a plurality of positions, it is impossible to grasp influences of electric power transmitted between the feeding portions, only through detection of impedances in the heating room, thereby inducing the problem of larger detection errors.

With control for operating feeding portions at a plurality of positions at the same oscillating frequency and for tracking the frequency, the distribution of synthesized electromagnetic waves is fixed, which has made it impossible to find optimum heating conditions depending on the placement of objects to be heated. Therefore, such control has been insufficient to cope with various amounts of various objects to be heated having different shapes and being of different types.

Further, conventional microwave heating apparatuses have had difficulty in properly heating, in desired states, various amounts of various objects to be heated having different shapes and being of different types only by changing the phase difference and the ratio between electric powers radiated from antennas serving as a plurality of feeding portions, thereby having induced the problem of poor heating efficiency.

Further, conventional microwave heating apparatuses have had the problem of necessity of excessively longer time periods for performing detection of impedances in the heating room and tracking of reflected electric power for conditions of all combinations of phase-difference controls and oscillating-frequency controls for feeding portions at a plurality of positions, in order to confirm an oscillating frequency which minimizes the reflected electric power.

The present invention was made in order to overcome the problems in the conventional microwave heating apparatuses and aims at detecting the state of placement of objects to be heated, determining optimum heating conditions for the detected state of placement of the objects to be heated more rapidly and more accurately, and optimally controlling heating operations based on the determined heating conditions. According to the present invention, there is provided a microwave heating apparatus which is capable of heating, in desired states, various amounts of various objects to be heated having different shapes and being of different types in shorter time periods, and is capable of reducing the microwave electric power returning from a heating room to feeding portions, at the same time, thereby enabling heating operations with higher efficiency.

Solution To Problem

A microwave heating apparatus in a first aspect of the present invention comprises a heating room adapted to house an object to be heated;

a placement table provided within the heating room and including a placement surface for placing the object to be heated;

an oscillation portion adapted to generate microwave electric power;

an electric-power dividing portion adapted to divide an output of the oscillation portion into a plurality of parts;

a plurality of feeding portions placed on a wall surface in the heating room and adapted to supply respective outputs of the electric-power dividing portion to the heating room;

a phase variation portion provided in a transmission path between the electric-power dividing portion and the feeding portions and adapted to vary, in phase, at least one of the outputs of the electric-power dividing portion;

a plurality of electric-power detection portions adapted to detect reflected electric power returning from the heating room to the feeding portions;

a movement mechanism portion adapted to relatively move a position of a straight line connecting two feeding portions, out of the plurality of feeding portions, to each other, with respect to the object to be heated on the placement table; and a control portion adapted to control an oscillating frequency of the oscillation portion, the output phase of the phase variation portion, and the position to which the movement mechanism portion moves; wherein the control portion is adapted to relatively move the position of the straight line connecting the two feeding portions to each other with respect to the object to be heated through the movement mechanism portion, is adapted to supply microwave electric powers controlled by the phase variation portion, to the heating room, through the two feeding portions, and is adapted to detect a phase difference between the microwave electric powers which minimizes the reflected electric power returning from the heating room to the two feeding portions for detecting a state of placement of the object to be heated on the placement table. The microwave heating apparatus having the structure in the first aspect is capable of detecting the state of placement of the object to be heated and, further, determining optimum heating conditions based on the detected state of placement of the object to be heated more rapidly and more accurately, and is thus capable of optimally controlling heating operations based on the determined heating conditions. As a result thereof, the microwave heating apparatus in the first aspect is capable of heating, in desired states, various amounts of various objects to be heated having different shapes and being of different types in shorter time periods, and is also capable of reducing the microwave electric power returning from the heating room, at the same time, thereby enabling heating operations with higher efficiency.

In a microwave heating apparatus in a second aspect of the present invention, the control portion in the first aspect is adapted to supply microwave electric powers having a phase difference through the two feeding portions to the heating room, and is adapted to detect a phase difference which minimizes the reflected electric power returning from the heating room to the two feeding portions for detecting the state of placement of the object to be heated on the placement table in a vertical plane including the straight line connecting the two feeding portions to each other. The microwave heating apparatus having the structure in the second aspect is adapted to detect the phase difference which minimizes the reflected electric power, for the object to be heated on the placement table in the vertical plane including the straight line connecting the two feeding portions to each other, and therefore is capable of easily detecting the state of placement of the object to be heated with higher accuracy, and is thus capable of detecting optimum heating conditions, with higher accuracy, in shorter time periods, for various amounts of various objects to be heated having different shapes and being of different types.

In a microwave heating apparatus in a third aspect of the present invention, the control portion in the second aspect is adapted to control at least the feeding portions, the phase variation portion and the movement mechanism portion, based on the detected state of the placement of the object to be heated on the placement table. The microwave heating apparatus having the structure in the second aspect is adapted to detect the phase difference which minimizes the reflected electric power, for the object to be heated on the placement table in the vertical plane including the straight line connecting the two feeding portions to each other, and therefore is capable of easily detecting the state of placement of the object to be heated with higher accuracy, and is thus capable of detecting optimum heating conditions, with higher accuracy, in shorter time periods, for various amounts of various objects to be heated having different shapes and being of different types.

In a microwave heating apparatus in a fourth aspect of the present invention, the placement table in the third aspect is adapted to be rotatable, and is adapted such that the object to be heated on the placement table passes through the vertical plane including the straight line connecting the two feeding portions to each other, when the placement table is rotated by the movement mechanism portion. The microwave heating apparatus having the structure in the fourth aspect is capable of easily and accurately detecting the state of placement of the object to be heated on the placement table in the vertical plane including the straight line connecting the two feeding portions to each other, and therefore is capable of detecting optimum heating conditions, in shorter time periods, for various amounts of various objects to be heated having different shapes and being of different types.

A microwave heating apparatus in a fifth aspect of the present invention, wherein one of the two feeding portions in the fourth aspect is placed near an outer periphery of the placement table, while the other feeding portion is placed near a center of the placement table. The microwave heating apparatus having the structure in the fifth aspect is capable of detecting the state of placement of the object to be heated with higher accuracy, and therefore is capable of detecting optimum heating conditions, with higher accuracy, in shorter time periods, for various amounts of various objects to be heated having different shapes and being of different types.

A microwave heating apparatus in a sixth aspect of the present invention, wherein at least a single feeding portion of the plurality of feeding portions in the third aspect comprises a rotational feeding portion which is coupled to the movement mechanism portion such that a direction of radiation is rotatable, while the other feeding portions comprise fixed feeding portions placed to be faced in the direction of radiation from the rotational feeding portion, and one feeding portion of the two feeding portions, which are supplied with microwave electric powers, forms the rotational feeding portion. The microwave heating apparatus having the structure in the sixth aspect is adapted to move radiation of microwaves among a plurality of directions through the movement mechanism portion and to detect the reflected electric power a plurality of times, and therefore is capable of detecting the state of placement of the object to be heated with higher accuracy and is capable of detecting optimum heating conditions, in shorter time periods, for various amounts of various objects to be heated having different shapes and being of different types.

In a microwave heating apparatus in a seventh aspect of the present invention, the control portion in the fifth aspect is adapted to detect a position, a number and a size of the object to be heated on the placement table in the vertical plane including the straight line connecting the two feeding portions to each other, by causing the movement mechanism to stop the rotation of the placement table. The microwave heating apparatus having the structure in the seventh aspect is adapted to detect the reflected electric power in a state where the object to be heated is stopped, and therefore is capable of detecting the state of placement of the object to be heated with higher accuracy.

In a microwave heating apparatus in an eighth aspect of the present invention, the control portion in the fifth aspect is adapted to detect the position, the number and the size of the object to be heated on the placement table in the vertical plane including the straight line connecting the two feeding portions to each other, while causing the movement mechanism to keep rotating the placement table. The microwave heating apparatus having the structure in the eighth aspect is capable of continuously grasping the change of the reflected electric power in the direction of the path of the movement of the object to be heated.

In a microwave heating apparatus in a ninth aspect of the present invention, the control portion in the third aspect is adapted to detect the state of placement of the object to be heated on the placement table in an initial stage in a heating operation and to control at least the feeding portions, the phase variation portion and the movement mechanism portion, and is adapted to perform an actual heating operation thereafter. The microwave heating apparatus having the structure in the ninth aspect is capable of determining optimum heating conditions according to the detected state of placement of the object to be heated, more rapidly and more accurately, and is capable of optimally controlling heating operations based on the determined heating conditions.

In a microwave heating apparatus in a tenth aspect of the present invention, the control portion in the sixth aspect is adapted to supply respective microwave electric powers having a controlled phase difference to the rotational feeding portion and the fixed feeding portions placed to be faced in the direction of radiation from the rotational feeding portion, and is adapted to detect the state of placement of the object to be heated on the placement table in the vertical plane including the straight line connecting the rotational feeding portion and the fixed feeding portions having been supplied with the microwave electric powers, to each other. The microwave heating apparatus having the structure in the tenth aspect is capable of detecting the state of placement of the object to be heated with higher accuracy, and is capable of detecting optimum heating conditions, in shorter time periods, for various amounts of various objects to be heated having different shapes and being of different types.

In a microwave heating apparatus in an eleventh aspect of the present invention, the fixed feeding portions in the sixth aspect are placed at even intervals at positions in a radial shape centered on the rotational feeding portion, and the control portion is adapted to detect the state of placement of the object to be heated on the placement table, by rotating the direction of radiation from the rotational feeding portion. The microwave heating apparatus having the structure in the eleventh aspect is adapted to move radiation of microwaves among a plurality of directions through the rotation of the rotational feeding portion and to detect the reflected electric power a plurality of times, and therefore is capable of grasping the state of placement of the object to be heated more continuously and is capable of detecting optimum heating conditions, in shorter time periods, for various amounts of various objects to be heated having different shapes and being of different types.

In a microwave heating apparatus in a twelfth aspect of the present invention, the control portion in the eleventh aspect is adapted to detect the state of placement of the object to be heated on the placement table, by successively stopping the direction of radiation from the rotational feeding portion at positions where the direction of radiation is faced to the fixed feeding portions. The microwave heating apparatus having the structure in the twelfth aspect is capable of accurately grasping the change of the reflected electric power in the direction of the path of the movement of the object to be heated, and therefore is capable of detecting more detailed information about the object to be heated, such as the size and the number, and is capable of determining optimum heating conditions, in shorter time periods, for various amounts of various objects to be heated having different shapes and being of different types.

Advantageous Effects of the Invention

The microwave heating apparatus according to the present invention is capable of accurately detecting the state of placement of objects to be heated within the heating room, determining optimum heating conditions according to the detected state of placement of the objects to be heated more rapidly and more accurately, and optimally controlling heating operations based on the determined heating conditions. As a result thereof, according to the present invention, it is possible to certainly heat, in desired states, various amounts of various objects to be heated having different shapes and being of different types in shorter time periods, and it is possible to reduce the microwave electric power returning from the heating room to the feeding portions, at the same time, thereby enabling heating operations with higher efficiency.

DETAILED DESCRIPTION OF THE PREFERRED EMBODIMENTS

Hereinafter, with reference to the accompanying drawings, there will be described preferred embodiments of a microwave heating apparatus according to the present invention. It is to be note that microwave heating apparatuses according to the following embodiments will be described as being microwave ovens, but these microwave ovens are merely illustrative, and the microwave heating apparatus according to the present invention is not limited to microwave ovens and is intended to also include heating apparatuses utilizing induction heating, garbage disposers, and microwave heating apparatuses such as semiconductor fabrication apparatuses. Further, the present invention is not limited to the concrete structures in the following embodiments and is intended to also include structures based on similar technical concepts.

First Embodiment

Figure 1:
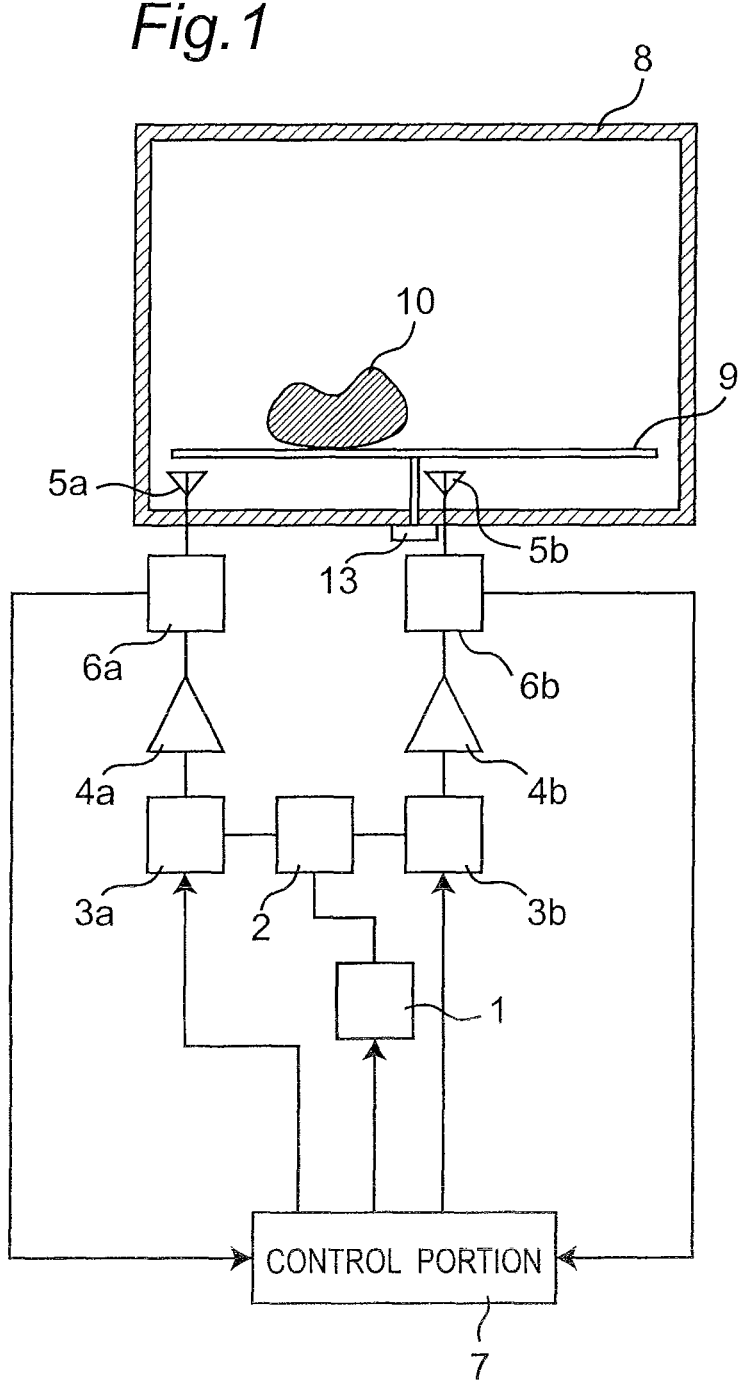
FIG. 1 is a block diagram illustrating the structure of a microwave generating portion in a microwave heating apparatus according to a first embodiment of the present invention.

FIG. 1 is a block diagram illustrating the structure of a microwave generating portion in a microwave heating apparatus according to a first embodiment of the present invention.

Referring to FIG. 1, the microwave generating portion in the microwave heating apparatus according to the first embodiment includes an oscillation portion 1 constituted by semiconductor devices, an electric-power dividing portion 2 for dividing the output of the oscillation portion 1 into two parts, amplification portions 4a and 4b constituted by semiconductor devices for amplifying the respective outputs of the electric-power dividing portion 2, and feeding portions 5a and 5b serving as antennas for supplying, to the inside of a heating room 8, microwave electric power having been amplified by the amplification portions 4a and 4b. Further, the microwave generating portion is provided with phase variation portions 3a and 3b which are inserted in the respective microwave propagation paths connecting the electric-power dividing portion 2 to the respective amplification portions 4a and 4b and are adapted to generate arbitrary phase differences between their inputs and outputs; electric-power detection portions 6a and 6b which are inserted in the respective microwave propagation paths connecting the amplification portions 4a and 4b to the feeding portions 5a and 5b and are adapted to detect the microwave electric powers returned from the heating room 8 to the respective feeding portions 5a and 5b; and a control portion 7 adapted to control the oscillating frequency of the oscillation portion 1 and the output phases of the phase variation portions 3a and 3b, according to the reflected electric powers detected by the electric-power detection portions 6a and 6b.

Note that the microwave heating apparatus according to the first embodiment is provided with a door (not illustrated) which is opened and closed for introducing and extracting an object to be heated 10, on a single wall surface which constitutes the heating room 8. The heating room 8 is constituted by shield plates made of a metal material at its wall surfaces other than the wall surface provided with the door, and thus the heating room 8 is structured to enclose microwaves radiated within the heating room 8.

Inside the heating room 8, there is provided a turntable 9 as a placement table for placing the object to be heated 10. The turntable 9 is provided within the heating room 8, such that its placement surface for placing the object to be heated 10 forms a horizontal surface. A motor 13 is coupled, at its driving shaft, to the center of the turntable 9, and the turntable 9 is structured to rotate such that its placement surface is horizontal. The feeding portions 5a and 5b at two positions, which have the same specifications, are placed on a surface which is substantially parallel with the placement surface of the turntable 9. In the first embodiment, one feeding portion 5a is placed under an outer periphery side of the turntable 9, while the other feeding portion 5b is placed under the vicinity of the rotational center of the turntable 9.

The microwave heating apparatus according to the first embodiment is structured such that, during heating, the motor 13 is driven to rotate the turntable 9, which causes the object to be heated 10 on the turntable 9 to move within the heating room 8, thereby reducing heating unevenness in the object to be heated 10. In the first embodiment, the motor 13 corresponds to a movement mechanism portion for moving the object to be heated 10 on the turntable 10 with respect to the position of the straight line connecting the feeding portions 5a and 5b to each other.

Hereinafter, there will be described operations of the microwave heating apparatus having the structure according to the first embodiment.

The object to be heated 10 is placed on the turntable 9 and is housed within the heating room 8, and a user inputs contents of heating settings for the object to be heated 10, to a manipulation portion (not illustrated). After the contents of the heating settings have been inputted to the manipulation portion, the manipulation portion outputs a heating start signal to the microwave generating portion, thereby starting heating operations.

In the microwave heating apparatus according to the first embodiment, in an initial stage in heating operations, namely in a stage before an actual heating operation for performing actual microwave heating on the object to be heated 10, load-state detection operations are performed for detecting the state of placement of the object to be heated within the heating room. At first, the load-state detection operations will be described.

On receiving a heating start signal from the manipulation portion, the control portion 7 operates a driving power supply (not illustrated), and supplies electric power to the oscillation portion 1.

At this time, the oscillation portion 1 is supplied, from the driving power supply, with a voltage signal for setting the frequency of the oscillating portion 1 to 2450 MHz, for example, thereby causing the oscillation portion 1 to start oscillating. The output of the oscillation portion 1 is divided into about halves by the electric-power dividing portion 2 to form two microwave electric powers. Thereafter, the control portion 7 controls the driving power supply for operating the amplification portions 4a and 4b. Note that, during the load-state detection operations, the microwave electric power outputted from each of the amplification portions 4a and 4b is set to an electric power smaller than a rated electric power, for example, to 100 W.

The respective microwave electric powers outputted from the amplification portions 4a and 4b being operated in parallel are supplied to the inside of the heating room 8, through the electric-power detection portions 6a and 6b and the feeding portions 5a and 5b. Out of the microwave electric power supplied to the inside of the heating room 8, the microwave electric power which has not been absorbed by the object to be heated 10 and the like (the reflected electric power) returns to the feeding portions 5a and 5b from the heating room 8.

The reflected electric powers returning to the respective feeding portions 5a and 5b are detected by the respective electric-power detection portions 6a and 6b. The electric-power detection portions 6a and 6b transmit, to the control portion 7, detection signals proportional to the detected amounts of reflected electric powers. The control portion 7 detects the amounts of reflected electric powers returning to the respective feeding portions 5a and 5b, based on the detection signals from the electric-power detection portions 6a and 6b.

The operation for detecting the amounts of reflected electric powers is performed, in a state where the object to be heated 10 is placed on the turntable 9, at intervals of a predetermined rotational angle of the turntable 9, for example, at 10-degrees intervals. The control portion 7 can detect the position of the turntable 9 at a rotational angle which has minimized the amounts of reflected electric powers, through the operation for detecting the amounts of reflected electric powers (a rotational-angle detection operation).

Further, during the load-state detection operations, the control portion 7 detects the reflected electric power, with respect to the microwave electric powers at different phases which have been supplied to the heating room 8 through the feeding portions 5a and 5b at the two positions. The operations for detecting the reflected electric power with respect to microwave electric powers at different phases are performed by varying the phase difference within the range of 0 to 360 degrees, with a 10-degrees pitch, through the phase variation portions 3a and 3b provided in the respective microwave propagation paths. When microwave electric powers having a phase difference with a 10-degrees pitch are supplied from the feeding portions 5a and 5b to the heating room 8, the amounts of reflected electric powers returning to the feeding portions 5a and 5b from the heating room 8 are detected by the electric-power detection portions 6a and 6b. The control portion 7 detects the amount of reflected electric power (a phase characteristic) with respect to the two microwave electric powers having a phase difference with a 10-degrees pitch, based on the detection signals from the electric-power detection portions 6a and 6b (a phase-characteristic detection operation).

The phase-characteristic detection operation is performed, with the turntable 9 positioned at the rotational angle having been detected through the rotational-angle detection operation, in a state where the object to be heated 10 is placed on the turntable 9. Note that the phase-characteristic detection operation can be also performed, alternately, at intervals of a predetermined rotational angle in a rotational-angle detection operation, such as 10-degrees intervals.

The control portion 7 can detect the state of placement of the object to be heated 10 (such as the position), based on the phase difference which minimizes the amount of reflected electric power, which has been detected through the phase-characteristic detection operation.

In the first embodiment, before the start of an actual heating operation, as described above, the state of the placement of the object to be heated 10 on the turntable 9 is detected. Further, based on the result of the detection, a feeding state appropriate to heating of this object to be heated 10 is selected, and optimum heating conditions are confirmed. As a result thereof, the microwave heating apparatus according to the first embodiment is capable of heating various amounts of various objects to be heated having different shapes and being of different types in desired states in shorter time periods, and concurrently reducing the microwave electric power returning from the heating room 8, and therefore is capable of performing efficient heating operations.

Figure 2:
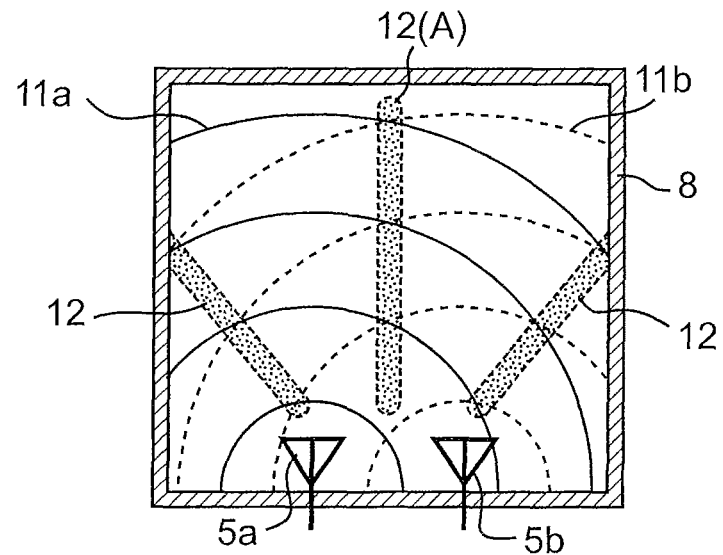
FIG. 2 is a view of propagation of microwaves in the microwave heating apparatus according to the first embodiment of the present invention.

Next, there will be described the relationship between the phase difference and the state of the placement of the object to be heated 10. FIG. 2 is a view of propagation of microwaves in the microwave heating apparatus according to the first embodiment.

As illustrated in FIG. 2, microwaves radiated from the feeding portions 5a and 5b at the two positions are spread radially as radio-wave propagations 11a and 11b indicated by arc-shaped lines. Since microwaves are reflected by the wall surfaces of the heating room 8, the spread of the radio-wave propagations 11a and 11b is complicated. However, microwaves which reach the object to be heated 10 after being reflected by the wall surfaces of the heating room 8 have reduced electric power, since they propagate longer paths. Therefore, in cases of considering microwave electric power which is absorbed by the object to be heated 10, propagation paths of microwaves which are directly absorbed by the object to be heated 10 from the feeding portions 5a and 5b are dominant.

As illustrated in FIG. 2, in the case where microwaves at the same phase are radiated from the feeding portions 5a and 5b, in same-phase interference areas 12 in which the radio-wave propagations 11a and 11b overlap with each other, the microwave electric powers are substantially summed. Accordingly, if the object to be heated 10 is placed in the same-phase interference area 12(A) formed between the two feeding portions 5a and 5b, the object to be heated 10 is intensively heated, thereby reducing the reflected electric power.

Figure 3:
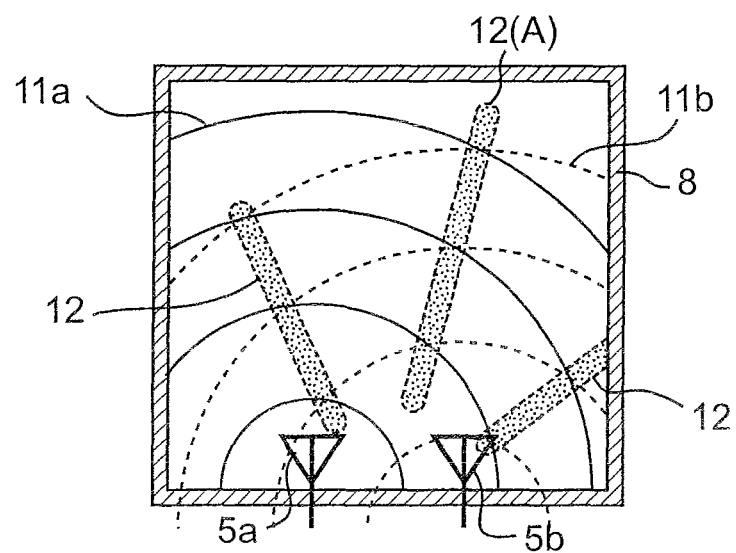
FIG. 3 is a view of propagation of microwaves having a phase difference, in the microwave heating apparatus according to the first embodiment of the present invention.

FIG. 3 is a view of propagation of microwaves in the microwave heating apparatus according to the first embodiment, in cases where microwaves having a phase difference are radiated from the two feeding portions 5a and 5b. As illustrated in FIG. 3, microwaves having a phase difference which have been radiated are spread radially as indicated by radio-wave propagations 11a and 11b. Due to the phase difference between the microwaves being radiated, the same-phase interference areas 12 in which the radio-wave propagations 11a and 11b overlap with each other at the same phase are shifted from the positions of the same-phase interference areas 12 illustrated in FIG. 2.

As described above, by changing the phase difference between the microwaves radiated from the feeding portions 5a and 5b at the two positions, it is possible to shift the same-phase interference area 12(A) to a desired position between the feeding portions 5a and 5b. Accordingly, by successively changing the phase difference between the microwaves radiated from the feeding portions 5a and 5b at the two positions, it is possible to detect the position of the object to be heated 10 on the straight line connecting the positions of the two feeding portions 5a and 5b to each other, by detecting a phase difference which minimizes the reflected electric power.

Figure 4:
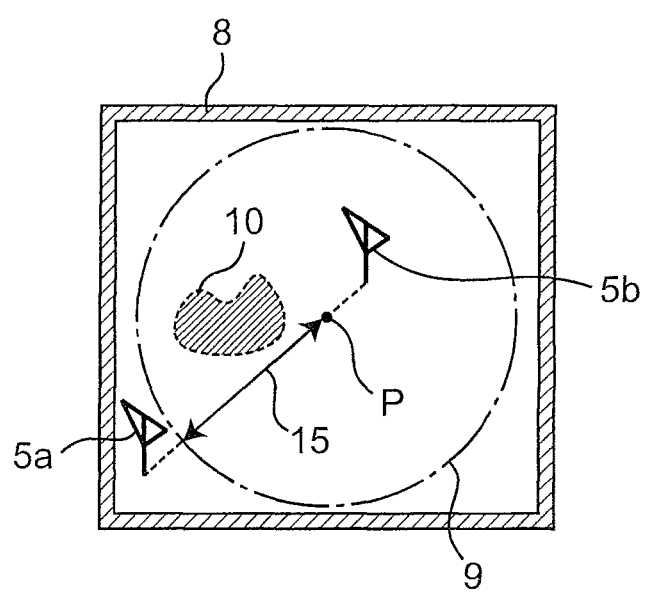
FIG. 4 is a view of placement of feeding potions in the microwave heating apparatuses according to the first embodiment of the present invention.

FIG. 4 is a view of the placement of the feeding portions 5a and 5b in the microwave heating apparatus according to the first embodiment. As illustrated in FIG. 4, the two feeding portions 5a and 5b are placed on the straight line including the rotational center P of the turntable 9 as the placement table within the heating room 8. As illustrated in FIG. 1, the feeding portions 5a and 5b are placed under the turntable 9, such that one feeding portion 5a is under the circumferential portion (the outer peripheral side) of the turntable 9, while the other feeding portion 5b is just under the vicinity of the rotational center P (the center side) of the turntable 9. Further, the feeding portions 5a and 5b are placed on the same horizontal surface. For the object to be heated 10 placed on the turntable 9, the motor 13 is driven to cause the turntable 9 to rotate, thereby rotating and moving the object to be heated 10. The two feeding portions 5a and 5b are placed within the heating room 8, such that the locus of movement of the object to be heated 10 on the turntable 9 passes through a vertical plane including the straight line 15 connecting the two feeding portions 5a and 5b to each other.

The range within which the position of the object to be heated 10 can be detected by supplying microwaves from the two feeding portions 5a and 5b with the phase difference being varied as described above is the position on the turntable 9 above the straight line 15 connecting the two feeding portions 5a and 5b to each other. Namely, the range within which the position of the object to be heated 10 can be detected is the position on the turntable 9 vertically above the portion between the feeding portions 5a and 5b.

While the turntable 9 is rotated to move the object to be heated 10, the reflected electric powers returning to the two feeding portions 5a and 5b are detected by the electric-power detection portions 6a and 6b, so that the reflected electric powers are reduced when the object to be heated 10 passes above the straight line 15 connecting the feeding portions 5a and 5b to each other (a vertical plane). Based on the phase difference and the rotational position of the turntable 9 of when the reflected electric power has been reduced, it is possible to detect the state of the placement of the object to be heated 10 on the turntable 9.

With the microwave heating apparatus according to the first embodiment, by stopping the turntable 9 at a rotational position which minimizes the electric power reflected to the two feeding portions 5a and 5b, and by detecting the phase difference between the microwaves supplied from the feeding portions 5a and 5b which minimizes the reflected electric power, it is possible to detect the state of the placement of the object to be heated 10 on the turntable 9.

Based on the state of the placement of the object to be heated 10 on the turntable 9, which has been detected as described above, proper heating conditions are determined, and desired microwave electric power is supplied from the feeding portions 5a and 5b to the heating room 8.

Note that, in the microwave heating apparatus according to the first embodiment, an oscillating-frequency detection operation for determining the oscillating frequency of the oscillation portion 1 is performed. During the oscillating-frequency detection operation, the control portion 7 controls the oscillation portion 1 to detect a frequency characteristic with respect to reflected electric power and extract an oscillating frequency which minimizes the reflected electric power detected by the electric-power detection portions 6a and 6b. Through this extraction operation, an oscillating frequency is determined. Then, an actual heating operation is performed at the determined oscillating frequency. In the oscillating-frequency detection operation, the control portion 7 operates the oscillation portion 1 until its oscillating frequency reaches from 2400 MHz to an upper limit of 2500 MHz within the frequency variation range, with a 1-MHz pitch, for example, and the control portion 7 determines an oscillating frequency which minimizes the reflected electric power.

In the microwave heating apparatus according to the first embodiment, in the case where a plurality of objects to be heated 10 are placed on the turntable 9, a plurality of minimum values of the reflected electric power are detected, since these objects to be heated 10 pass above the straight line 15 connecting the feeding portions 5a and 5b to each other (a vertical plane). Therefore, based on the number of times that the reflective electric power is minimized, the control portion 7 can detect the number of the objects to be heated 10.

In the microwave heating apparatus according to the first embodiment, regarding the state of the placement of the object to be heated 10 on the turntable 9, minimum reflected electric power is detected at intervals of a predetermined rotational angle of the turntable 9, and a desired rotational angle is determined. Further, at this rotational angle, phase characteristics of microwaves which minimize the reflected electric power are detected. Thus, the position of the object to be heated 10 is identified. However, the present invention is not limited to such detection operations. For example, phase-characteristic detection can be also performed at intervals of a predetermined rotational angle of the turntable 9, in order to attain load-state detection operations with higher accuracy. Further, in cases of performing phase-characteristic detection at predetermined rotational-angle intervals as described above, if the detected reflected electric power gets to have a value equal to or less than a threshold value, it is possible to estimate that the object to be heated 10 is placed at the detected position at this time, and then it is possible to start an actual heating operation. With this structure, it is possible to determine the state of the placement of the object to be heated 10 in a shorter time period and to start an actual heating operation.

Note that, while the structure according to the first embodiment has been described with respect to an example where the phase variation portions 3a and 3b are provided for the respective outputs of the electric-power dividing portion 2, it is possible to change the phase difference, provided that the phase variation portion is connected to any one of the outputs.

In the microwave heating apparatus according to the first embodiment, based on the state of the placement of the object to be heated 10 on the turntable 9, the control portion 7 controls at least the feeding portions 5a and 5b, the phase variation portions 3a and 3b, and the motor 13 serving as the movement mechanism portion, in order to perform microwave heating operations under optimum heating conditions for the object to be heated 10. Note that, according to the heating conditions, the control portion 7 performs control of the oscillating frequency of the oscillation portion 1, and adjustments of the outputs of the amplification portions 4a and 4b.

While the microwave heating apparatus according to the first embodiment has been described with respect to a structural example where the control portion 7 stops the turntable 9 at predetermined rotational-angle intervals and detects the state of the placement of the object to be heated 10 on the turntable 9 above the straight line connecting the two feeding portions 5a and 5b to each other (in a vertical plane), it is also possible to detect the state of the placement of the object to be heated 10 in the state where the turntable 9 is kept rotating. Namely, in the state where the turntable 9 is rotating, an operation for detecting the rotational angle of the turntable 9 and an operation for detecting a phase characteristic can be performed successively and alternately. This results in reduction of the operating time period for the load-state detection operations, thereby enabling reduction of the heating time period.

While the microwave heating apparatus according to the first embodiment is structured to perform the load-state detection operations for detecting the state of the placement of the object to be heated 10 on the turntable 9 in an initial stage of heating operations and to perform an actual heating operation based on the result of the detection, it is also possible to perform the load-state detection operations (the rotational-angle detection operation and the phase-characteristic detection operation), while performing an actual heating operation according to heating conditions.

As described above, the microwave heating apparatus according to the first embodiment is capable of accurately detecting the state of the placement of the object to be heated 10 by performing the load-state detection operations. Therefore, the microwave heating apparatus according to the first embodiment is capable of performing, anytime, desired microwave heating on the object to be heated 10 with higher efficiency.

Second Embodiment

Figure 5:
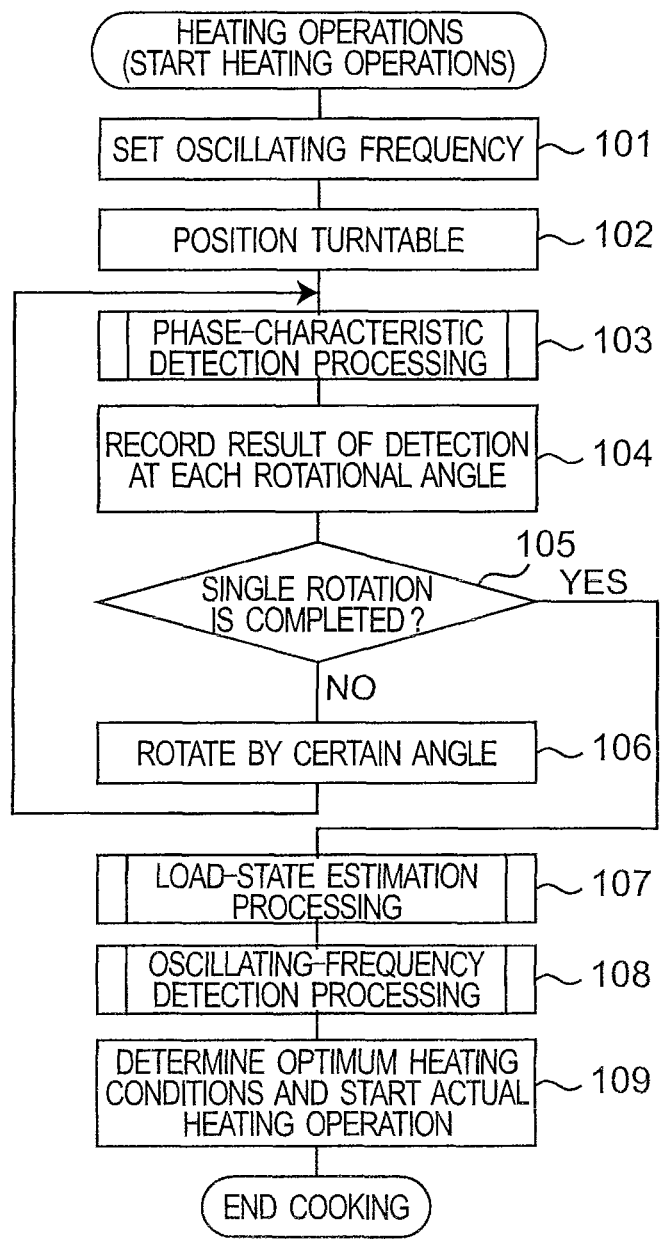
FIG. 5 is a flow chart illustrating a main flow illustrating load-state detection operations in a microwave heating apparatus according to a second embodiment of the present invention.
Figure 6:
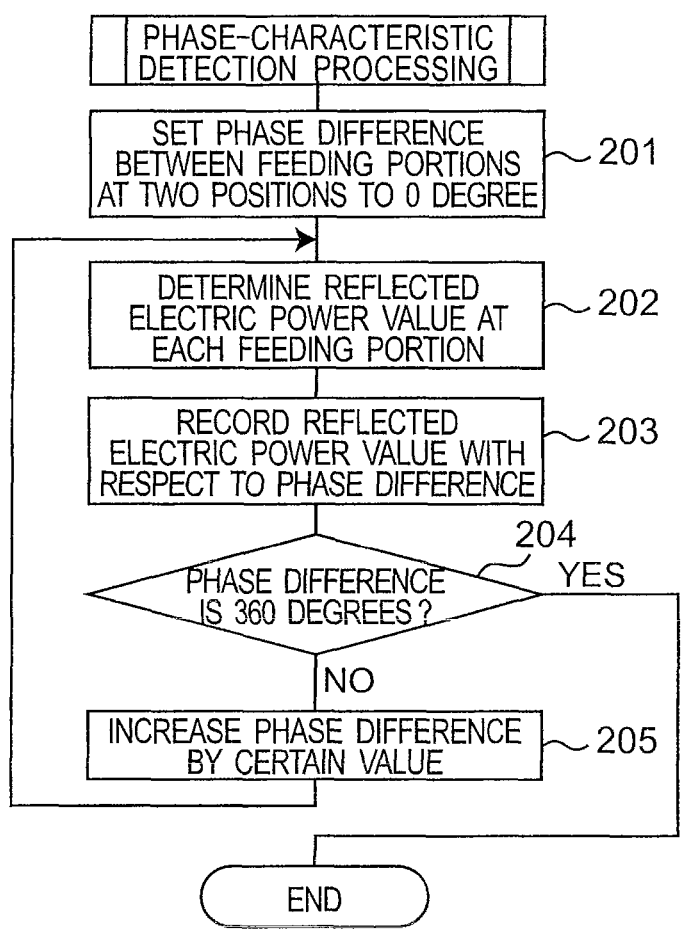
FIG. 6 is a flow chart illustrating phase-characteristic detection processing in the microwave heating apparatus according to the second embodiment of the present invention.
Figure 7:
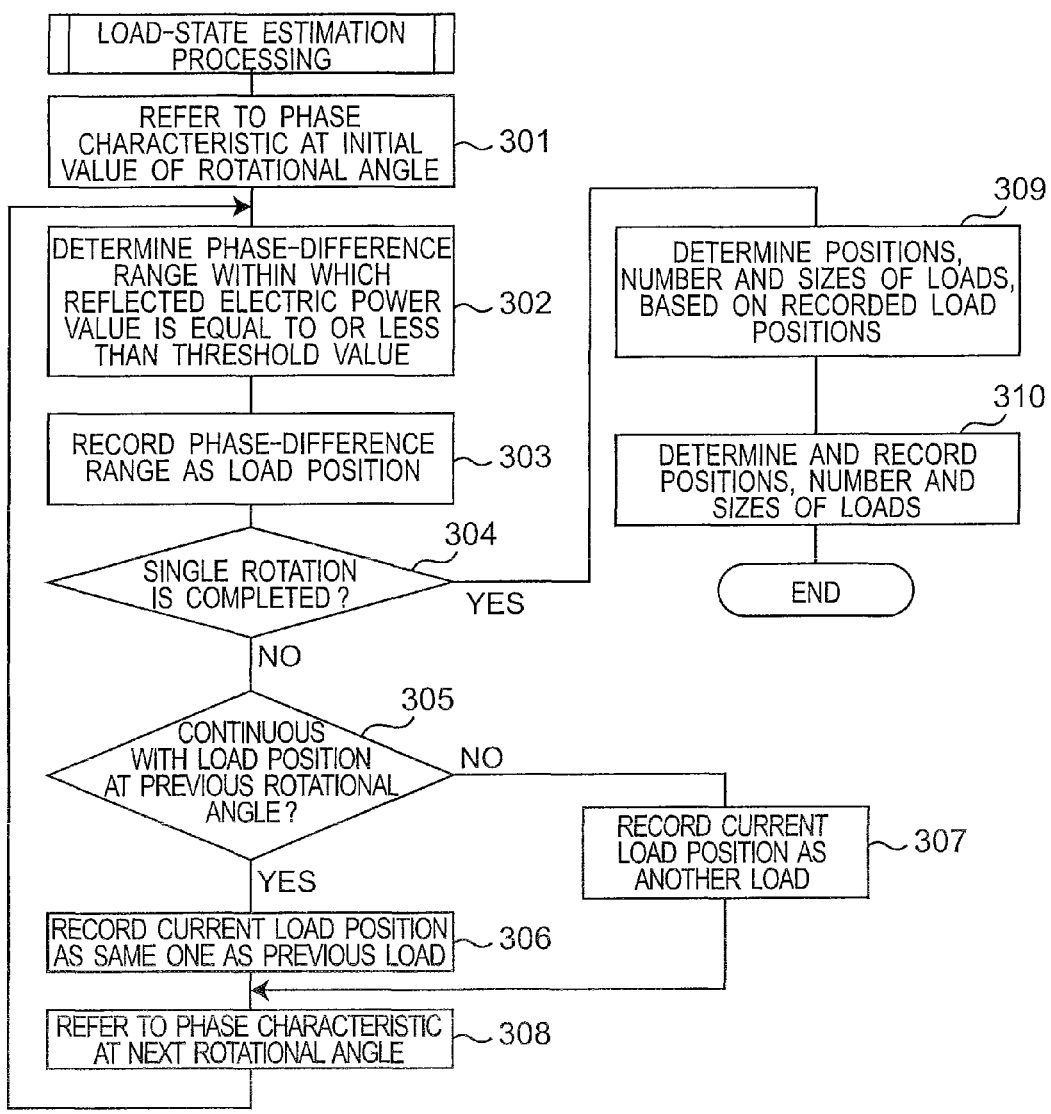
FIG. 7 is a flow chart illustrating load-state estimation processing in the microwave heating apparatus according to the second embodiment of the present invention.

Hereinafter, there will be described a microwave heating apparatus according to a second embodiment of the present invention. The microwave heating apparatus according to the second embodiment is different from the microwave heating apparatus according to the first embodiment, in terms of load-state detection operations performed by a microwave generating portion, but the basis structure is the same as that of the microwave heating apparatus according to the first embodiment. FIGS. 5 to 7 are flow charts illustrating load-state detection operations in the microwave heating apparatus according to the second embodiment.

In the following description of the second embodiment, components having the same functions and structures as those of the components in the microwave heating apparatus according to the first embodiment will be designated by the same reference characters, and detailed descriptions thereof will be omitted by substituting the description of the first embodiment.

The microwave heating apparatus according to the second embodiment includes a microwave generating portion having the same structure as that of the microwave generating portion in the microwave heating apparatus according to the first embodiment illustrated in FIG. 1. Hereinafter, with reference to the flow charts in FIGS. 5 to 7, there will be described heating operations including load-state detection operations which are performed by the microwave generating portion in the microwave heating apparatus according to the second embodiment.

[Heating Operations]

FIG. 5 is a flow chart illustrating a main flow illustrating the load-state detection operations. As illustrated in the flow chart in FIG. 5, heating operations are started, according to the contents of heating settings (a heating start signal) from the manipulation portion.

In step 101, the frequency of the oscillation portion 1 is set to a predetermined oscillating frequency, such as 2450 MHz, and the oscillation portion 1 starts oscillating.

In step 102, positioning of the turntable 9 is performed. Namely, the turntable 9 is set to be at an initial position.

In step 103, phase-characteristic detection processing which will be described later is performed. In the phase-characteristic detection processing, in the state where the rotation of the turntable 9 is stopped, microwave electric powers being varied in phase are supplied from the two feeding portions 5a and 5b to the heating room 8, and the reflected electric power is detected.

In step 104, the result of the phase-characteristic detection in the previous stage is recorded. As the recording in step 104, a phase characteristic at each rotational angle of the turntable 9 is recorded.

In step 105, it is determined whether or not the turntable 9 has completed a single rotation and the phase-characteristic detection over the entire placement surface of the turntable 9 has been completed. If the turntable 9 has not yet completed a single rotation, then, in step 106, the turntable 9 is rotated by a certain angle, and the next phase-characteristic detection processing is performed.

If, in step 105, the turntable 9 is detected as having completed a single rotation, then in step 107, load-state estimation processing which will be described later is performed. Through the load-state estimation processing, the positions of objects to be heated on the turntable 9, and the number and the size of the objects to be heated are detected.

In the second embodiment, steps 101 to 107 described above correspond to the load-state detection operations.

In step 108, oscillating-frequency detection processing is performed. The oscillating-frequency detection processing is processing for detecting an oscillating frequency of the oscillation portion 1 which minimizes the reflected electric power, wherein the detection is performed by sweeping the oscillating frequency of the oscillation portion 1 within the frequency range of 2400 kHz to 2500 kHz. In this oscillating-frequency detection processing, based on the result of the detection through the load-state estimation processing in the previous stage, the turntable 9 is set to be at an optimum rotational angle, and the phase difference between microwave electric powers is set to be an optimum phase difference.

In step 109, based on the results of the detections through the load-state estimation processing and the frequency detection processing, optimum heating conditions for the object to be heated 10 are determined, and an actual heating operation is started according to the optimum heating conditions.

[Phase-Characteristics Detection Processing]

FIG. 6 is a flow chart illustrating the phase-characteristic detection processing which is performed in step 103 in the main flow (see FIG. 5).

In step 201, the phase difference between the microwave electric powers radiated from the feeding portions 5a and 5b at the two positions is set to 0 degree, as an initial value. Namely, microwave electric powers at the same phase are supplied from the two feeding portions 5a and 5b to the heating room 8, thereby forming a same-phase interference area (see the same-phase interference area 12(A) in FIG. 2), at a position midway between the two feeding portions 5a and 5b.

In step 202, the values of the reflected electric powers that the two feeding portions 5a and 5b have received from the heating room 8 are determined.

In step 203, the value of the reflected electric power determined when the phase difference was 0 degree (the initial value) is recorded. The determinations of the reflected electric power values in steps 202 and 203 described above are performed by changing the phase difference in steps of a certain value, such as 10 degrees. The determination range corresponds to the phase-difference range of 0 to 360 degrees. The routine of the determination of the reflected electric power value within the range of 0 to 360 degrees is performed by repeating steps 202 to 205.

In step 204, if the phase difference is determined to be 360 degrees, this phase-characteristic detection processing ends, and the operation proceeds to step 104 illustrated in FIG. 5.

[Load-State Estimation Processing]

FIG. 7 is a flow chart illustrating the load-state estimation processing which is performed in step 107 in the main flow (see FIG. 5).

In step 301, a reference is made to the result of the phase-characteristic detection when the rotational angle of the turntable 9 was set to the initial value.

In step 302, a determination is made of the phase-difference range within which the reflected electric power value is equal to or less than a threshold value, when the rotational angle of the turntable 9 is set to the initial value. Here, the threshold value used is a value of the ratio of the reflected electric power to the microwave electric power supplied to the heating room 8. For example, when the ratio is equal to or less than 50%, the object to be heated 10 which forms a load is determined to exist at a corresponding position.

The phase-difference range determined in step S302 is recorded as a load position, namely the position of an object to be heated 10 on the turntable 9 (step 303). The determination of the presence of a load, and the recording of the load position in steps 302 and 303 are performed until the completion of a single rotation of the turntable 9.

In step 304, it is determined whether or not the rotational angle of the turntable 9 to which a reference is being made indicates the completion of a single rotation.

If, in step 304, the rotational angle of the turntable 9 to which a reference is being made does not indicate the completion of a single rotation, the processing proceeds to step 305. In step 305, it is determined whether or not the load position on the turntable 9 at the previous rotational angle is continuous with the load position on the turntable 9 at the current rotational angle. Namely, it is determined whether or not the phase-difference range within which the reflected electric power value is equal to or less than the threshold value at the previous rotational angle is continuous with the same phase-difference range at the current rotational angle.

If it is determined, in step 305, that the load positions are not continuous with each other, then, in step 307, the load position at the current rotational angle is recorded as one indicating the position of another load (an object to be heated).

On the other hand, if it is determined, in step 305, that the load positions are continuous with each other, then, in step 306, the load (the object to be heated) detected at the current rotational angle is recorded as the same one as the load (the object to be heated) at the previous rotational angle.

In step 308, a reference is made to the result of the detection of the phase characteristic at the next rotational angle of the turntable 9, and the processing proceeds to step 302.

If, in step 304, the rotational angle of the turntable 9 to which a reference is being made indicates the completion of a single rotation, the processing proceeds to step 309. In step 309, based on the recorded load positions, the ranges of the loads on the turntable 9 are determined, and the state of the placement of the loads (the objects to be heated), namely the positions and the number of the loads, and the sizes of the respective loads, are determined.

In step 310, the number and the positions of the loads (the objects to be heated), and the sizes of the respective loads are confirmed, and the confirmed information is recorded.

As described above, the microwave heating apparatus according to the second embodiment is capable of determining the state of the placement of objects to be heated 10, namely the positions of the objects to be heated 10 on the turntable 9 and the number and the sizes of the objects to be heated 10, through the load-state detection operations. Therefore, the microwave heating apparatus according to the second embodiment is capable of performing, anytime, desired microwave heating on the objects to be heated 10 with higher efficiency.

Third Embodiment

Figure 8:
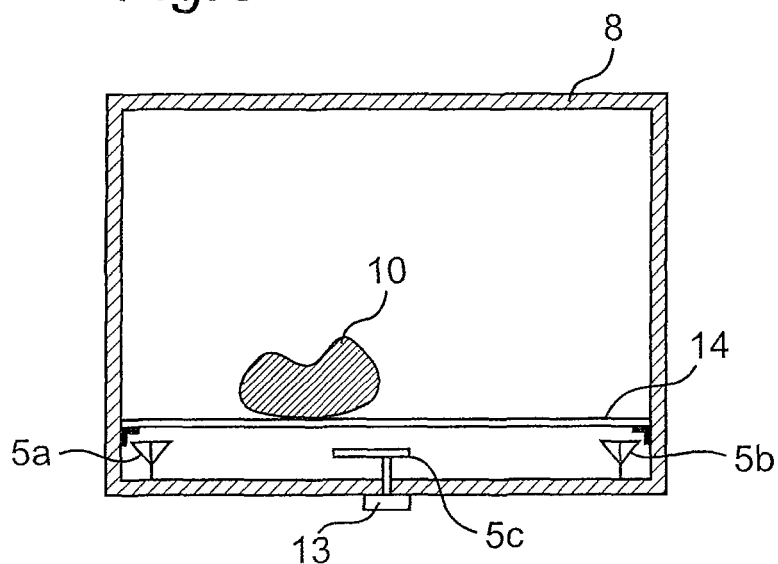
FIG. 8 is a schematic structural view illustrating a placement table and feeding portions in a heating room in a microwave heating apparatus according to a third embodiment of the present invention.
Figure 9:
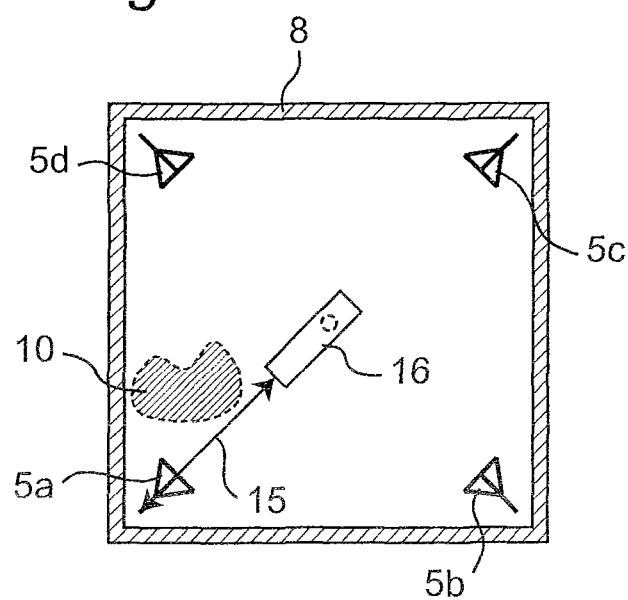
FIG. 9 is a plan view illustrating the structure of the feeding portions in the heating room in the microwave heating apparatus according to the third embodiment of the present invention.

Hereinafter, there will be described a microwave heating apparatus according to a third embodiment of the present invention. The microwave heating apparatus according to the third embodiment is different from the microwave heating apparatus according to the first embodiment, in terms of the structures of feeding portions and a placement table, and load-state detection operations performed by a microwave generating portion. The other portions of the microwave heating apparatus according to the third embodiment have the same basic structures, as those of the microwave heating apparatus according to the first embodiment. FIG. 8 is a schematic structural view illustrating the placement table and the feeding portions within a heating room in the microwave heating apparatus according to the third embodiment. FIG. 9 is a plan view illustrating the structure of the feeding portions within the heating room in the microwave heating apparatus according to the third embodiment.

In the following description of the third embodiment, components having the same functions and structures as those of the components in the microwave heating apparatus according to the first embodiment will be designated by the same reference characters, and detailed descriptions thereof will be omitted by substituting the description of the first embodiment.

The microwave generating portion in the microwave heating apparatus according to the third embodiment has the same structure as that of the microwave generating portion in the microwave heating apparatus according to the first embodiment illustrated in FIG. 1. However, the microwave heating apparatus according to the third embodiment includes three or more feeding portions within the heating room, and therefore, the microwave generating portion is provided with a plurality of electric-power dividing portions, a plurality of phase variation portions, a plurality of amplification portions, and a plurality of electric-power detection portions, in association with the number of the feeding portions.

As illustrated in FIG. 8, in the microwave heating apparatus according to the third embodiment, a shelf 14 as a placement table for objects to be heated 10 is provided within the heating room 8. The shelf 14 is placed such that its placement surface forms a horizontal surface, and an object to be heated 10 is placed on the placement surface of the shelf 14.

In the microwave heating apparatus according to the third embodiment, the plurality of feeding portions 5a, 5b, 5c and 5d are placed under the shelf 14. These feeding portions 5a, 5b, 5c and 5d are secured to the heating room 8 and will be referred to as fixed feeding portions 5a, 5b, 5c and 5d in the following description. Further, just beneath the center position of the placement surface of the shelf 14, there is provided a rotational feeding portion 16 as a feeding portion as an antenna capable of rotating the direction of radiation in a horizontal plane.

As illustrated in FIG. 9, in the microwave heating apparatus according to the third embodiment, the feeding portions 5a, 5b, 5c and 5d as four antennas are provided at the four corners of the bottom surface in the heating room 8, in an area under the shelf 14. Further, the rotational feeding portion 16 as a feeding portion as another antenna is placed at a substantially-center position on the bottom surface in the heating room 8. The rotational feeding portion 16 is rotatably provided, such that the direction of radiation is oriented toward each of the fixed feeding portions 5a, 5b, 5c and 5d. Namely, the fixed feeding portions 5a, 5b, 5c and 5d are placed at even intervals at positions in a radial shape centered on the rotational feeding portion 16. The fixed feeding portions 5a, 5b, 5c and 5d and the rotational feeding portion 16 are placed on a surface substantially parallel with the placement surface of the shelf 14. In the third embodiment, the direction of radiation from the rotational feeding portion 16 is rotated by a motor 13 for combining it with the fixed feeding portion 5a, 5b, 5c or 5d, so that a position 15 of the straight line connecting the feeding portions to each other can be relatively moved with respect to the object to be heated 10 on the shelf 14.

In the third embodiment, the motor 13 corresponds to a movement mechanism portion for relatively moving the position of the straight line connecting the rotational feeding portion 16 to the fixed feeding portion 5a, 5b, 5c or 5d to each other with respect to the object to be heated 10 on the shelf 14.

In performing heating operations with the microwave heating apparatus according to the third embodiment, any one fixed feeding portion is selected from the fixed feeding portions 5a, 5b, 5c and 5d, and the selected fixed feeding portion and the rotational feeding portion 16 at the center are caused to radiate microwave electric power within the heating room 8.

The microwave heating apparatus according to the third embodiment is structured to supply microwaves to the rotational feeding portion 16 and any one fixed feeding portion out of the fixed feeding portions 5a, 5b, 5c and 5d, in such a way as to induce an arbitrary phase difference through a phase variation portion, similarly to the structure according to the first embodiment. Further, the reflected electric powers returning to the rotational feeding portion 16 and the fixed feeding portions 5a, 5b, 5c and 5d from the heating room 8 are detected by the electric-power detection portions.

When the motor 13 is driven, the rotational feeding portion 16 is rotated, which moves the direction of radiation of microwaves. As such, the direction of radiation of microwaves from the rotational feeding portion 16 is moved, which alleviates the heating unevenness in the object to be heated 10 on the shelf 14 placed in the heating room 8.

The microwave heating apparatus according to the third embodiment is adapted to perform load-state detection operations similar to the load-state detection operations according to the first embodiment.

The load-state detection operations according to the third embodiment are performed by rotating the rotational feeding portion 16 at an approximate center of the heating room 8. The direction of radiation of microwaves from the rotational feeding portion 16 is set to the direction toward the fixed feeding portion 5a (in a downward and leftward direction in FIG. 9), for example, and a phase difference which minimizes the reflected electric power with the combination of the rotational feeding portion 16 and the fixed feeding portion 5a is detected. Through the phase-characteristic detection processing, it is possible to detect the state of the placement of the object to be heated 10 above the straight line 15 connecting the two feeding portions 5a and 16 to each other (in a vertical plane).

Next, the fixed feeding portion 16 is rotated to set the direction of radiation of microwaves to the direction toward another fixed feeding portion 5b (in a downward and rightward direction in FIG. 9), for example, and a phase difference which minimizes the reflected electric power with the combination of the rotational feeding portion 16 and the fixed feeding portion 5b is detected. Through the phase-characteristic detection processing, it is possible to detect the state of the placement of the object to be heated 10 above the straight line connecting the two feeding portions 5b and 16 to each other (in a vertical plane). Similarly, the rotational feeding portion 16 is successively rotated, and the state of the placement of the object to be heated 10 between the rotational feeding portion 16 and the feeding portion 5c or 5d is detected.

As described above, the microwave heating apparatus according to the third embodiment is adapted to perform the load-state detection operations, by rotating the direction of radiation of microwaves from the rotational feeding portion 16 at a substantially-center position on the bottom surface in the heating room 8, namely just under the center of the placement surface of the shelf 14, within a plane parallel with the placement surface for the object to be heated 10. The load-state detection operations are adapted to successively perform detection of a phase difference which minimizes the reflected electric power, with the combination of the rotational feeding portion 16 and the fixed feeding portion 5a, 5b, 5c or 5d which exists in the direction of radiation from the rotational feeding portion 16. By performing detection of phase differences (phase-characteristic detection processing) which minimize the reflected electric power, it is possible to accurately detect the state of the placement of the object to be heated on the shelf 14 (the placement surface) as a placement table.

The microwave heating apparatus according to the third embodiment is adapted to perform the phase detection operation and the frequency detection operation which have been described in the first embodiment to determine optimum heating conditions for the object to be heated 10 for performing an actual heating operation.

As described above, the microwave heating apparatus according to the third embodiment is capable of determining the state of the placement of the object to be heated 10, by performing the load-state detection operations. Therefore, the microwave heating apparatus according to the third embodiment is capable of performing, anytime, desired microwave heating on the object to be heated 10 with higher efficiency.

Note that, during the load-state detection operations, it is also possible to successively perform changeovers among the fixed feeding portions, in such a way as to excite a fixed feeding portion being faced in the direction of radiation of microwaves and to supply microwaves to this fixed feeding portion, while rotating the rotational feeding portion 16. As such, during the operation for rotating the rotational feeding portion 16 while successively changing over the feeding portion being faced in the direction of radiation of microwaves, when the reflected electric power is detected, smaller electric power is reflected to a feeding portion closer to the position at which the object to be heated 10 is placed, which enables estimation of, in a shorter time period, the placement of the object to be heated 10 in the direction of rotation.

Further, as the structure according to the third embodiment, there has been described a structure in which the rotational feeding portion 16 is provided at a substantially-center position on the bottom surface in the heating room 8, and the fixed feeding portions 5a, 5b, 5c and 5d are provided at the four corners of the bottom surface in the heating room 8, but the fixed feeding portions provided in the heating room 8 are not limited to those at four positions. By providing more fixed feeding portions at even intervals at positions in a radial shape centered on the rotational feeding portion 16, it is possible to detect the state of the placement of the object to be heated with higher accuracy.

While the respective embodiments have been described with respect to structures adapted to perform the load-state detection operations for detecting the state of placement of objects to be heated within the heating room, in a stage before an actual heating operation, it is also possible to employ a structure adapted to perform the load-state detection operations concurrently with actual heating operations. On receiving a heating start signal from the manipulation portion, the control portion can start an actual heating operation based on the contents of heating settings having been made through the manipulation portion, and also can perform the load-state detection operations concurrently therewith, in order to determine optimum heating conditions which minimize the reflected electric power. After the optimum heating conditions have been determined, microwave heating operations are performed according to the optimum heating conditions. Accordingly, by performing the load-state detection operations concurrently with actual heating operations, it is possible to shorten heating time periods.

Note that, while the respective embodiments have been described with respect to examples where the combination of the feeding portions is installed on a single wall surface (the bottom surface) of the heating room, the combination of the feeding portions can also be placed on a plurality of wall surfaces.

As described above, the microwave heating apparatus according to the present invention is adapted to detect the state of placement of objects to be heated for determining optimum heating conditions, and is adapted to perform microwave heating operations according to the optimum heating conditions. Therefore, the microwave heating apparatus according to the present invention is capable of heating, in desired states, various amounts of various objects to be heated having different shapes and being of different types in shorter time periods, and also is capable of reducing microwave electric power returning to the feeding portions from the heating room, at the same time, thereby enabling microwave heating operations with higher accuracy.

INDUSTRIAL APPLICABILITY

The microwave heating apparatus according to the present invention is capable of performing microwave heating on various amounts of various objects to be heated having different shapes and being of different types, under optimum heating conditions, by performing load-state detection operations. Therefore, the microwave heating apparatus according to the present invention can also be applied to heating apparatuses which utilize induction heating as represented by microwave ovens, garbage disposers, microwave generators in plasma power supplies serving as semiconductor fabrication apparatuses or other various applications.

The invention claimed is:

1. A microwave heating apparatus comprising:
a heating room adapted to house an object to be heated;
a placement table provided within the heating room and including a placement surface for placing the object to be heated;
an oscillation portion adapted to generate microwave electric power;
an electric-power dividing portion adapted to divide an output of the oscillation portion into a plurality of parts;
a plurality of feeding portions placed on a wall surface in the heating room and adapted to supply respective outputs of the electric-power dividing portion to the heating room;
a phase variation portion provided in a transmission path between the electric-power dividing portion and the feeding portions and adapted to vary, in phase, at least one of the outputs of the electric-power dividing portion;
a plurality of electric-power detection portions adapted to detect reflected electric power returning from the heating room to the feeding portions;
a movement mechanism portion adapted to relatively move a position of a straight line connecting two feeding portions, out of the plurality of feeding portions, to each other, with respect to the object to be heated on the placement table; and
a control portion adapted to control an oscillating frequency of the oscillation portion, the output phase of the phase variation portion, and the position to which the movement mechanism portion moves; wherein
the control portion is adapted to relatively move the position of the straight line connecting the two feeding portions to each other with respect to the object to be heated through the movement mechanism portion, is adapted to supply microwave electric powers controlled by the phase variation portion, to the heating room, through the two feeding portions, and is adapted to detect a phase difference between the microwave electric powers which minimizes the reflected electric power returning from the heating room to the two feeding portions for detecting a state of placement of the object to be heated on the placement table.

2. The microwave heating apparatus according to claim 1, wherein
the control portion is adapted to supply microwave electric powers having a phase difference through the two feeding portions to the heating room, and is adapted to detect a phase difference which minimizes the reflected electric power returning from the heating room to the two feeding portions for detecting the state of placement of the object to be heated on the placement table in a vertical plane including the straight line connecting the two feeding portions to each other.

3. The microwave heating apparatus according to claim 2, wherein
the control portion is adapted to control at least the feeding portions, the phase variation portion and the movement mechanism portion, based on the detected state of the placement of the object to be heated on the placement table.

4. The microwave heating apparatus according to claim 3, wherein
the placement table is adapted to be rotatable, and is adapted such that the object to be heated on the placement table passes through the vertical plane including the straight line connecting the two feeding portions to each other, when the placement table is rotated by the movement mechanism portion.

5. The microwave heating apparatus according to claim 4, wherein
one of the two feeding portions is placed near an outer periphery of the placement table, while the other feeding portion is placed near a center of the placement table.

6. The microwave heating apparatus according to claim 3, wherein
at least a single feeding portion comprises a rotational feeding portion of the plurality of feeding portions which is coupled to the movement mechanism portion such that a direction of radiation is rotatable, while the other feeding portions comprise fixed feeding portions placed to be faced in the direction of radiation from the rotational feeding portion, and
one feeding portion of the two feeding portions, which are supplied with microwave electric powers, forms the rotational feeding portion.

7. The microwave heating apparatus according to claim 5, wherein the control portion is adapted to detect a position, a number and a size of the object to be heated on the placement table in the vertical plane including the straight line connecting the two feeding portions to each other, by causing the movement mechanism to stop the rotation of the placement table.

8. The microwave heating apparatus according to claim 5, wherein the control portion is adapted to detect the position, the number and the size of the object to be heated on the placement table in the vertical plane including the straight line connecting the two feeding portions to each other, while causing the movement mechanism to keep rotating the placement table.

9. The microwave heating apparatus according to claim 3, wherein the control portion is adapted to detect the state of placement of the object to be heated on the placement table in an initial stage in a heating operation and to control at least the feeding portions, the phase variation portion and the movement mechanism portion, and is adapted to perform an actual heating operation thereafter.

10. The microwave heating apparatus according to claim 6, wherein the control portion is adapted to supply respective microwave electric powers having a controlled phase difference to the rotational feeding portion and the fixed feeding portions placed to be faced in the direction of radiation from the rotational feeding portion, and is adapted to detect the state of placement of the object to be heated on the placement table in the vertical plane including the straight line connecting the rotational feeding portion and the fixed feeding portions having been supplied with the microwave electric powers, to each other.

11. The microwave heating apparatus according to claim 6, wherein the fixed feeding portions are placed at even intervals at positions in a radial shape centered on the rotational feeding portion, and the control portion is adapted to detect the state of placement of the object to be heated on the placement table, by rotating the direction of radiation from the rotational feeding portion.

12. The microwave heating apparatus according to claim 11, wherein the control portion is adapted to detect the state of placement of the object to be heated on the placement table, by successively stopping the direction of radiation from the rotational feeding portion at positions where the direction of radiation is faced to the fixed feeding portions.

* * * * *